United States Patent [19]

Masuyama et al.

[11] 4,091,393
[45] May 23, 1978

[54] AUTOMATIC PENCIL APPARATUS FOR AN AUTOMATED DRAFTING SYSTEM

[75] Inventors: Masami Masuyama; Tsukasa Edo, both of Narashino, Japan

[73] Assignee: Kabushiki Kaisha Daini Seikosha, Japan

[21] Appl. No.: 699,356

[22] Filed: Jun. 24, 1976

[30] Foreign Application Priority Data

Jun. 24, 1975 Japan .................................. 50-77849

[51] Int. Cl.² ........................................... G01D 15/24
[52] U.S. Cl. ................................. 346/139 C; 33/18 R
[58] Field of Search ..................... 346/139 C, 139 R; 33/18 R

[56] References Cited

U.S. PATENT DOCUMENTS

| | | | |
|---|---|---|---|
| 3,939,482 | 2/1976 | Cotter | 346/139 C |
| 3,971,036 | 7/1976 | Gerber | 346/139 C |
| 4,015,269 | 3/1977 | Edo | 346/139 C |

Primary Examiner—Joseph W. Hartary
Attorney, Agent, or Firm—Robert E. Burns; Emmanuel J. Lobato; Bruce L. Adams

[57] ABSTRACT

An automatic pencil apparatus for an automated drafting system comprises a gripping means for holding and lifting a lead. The lead is pressed by means of a pressing means. The gripping means is actuated, by a driving means including an electromagnet, in the longitudinal direction. A change-over means supplys compressed air into the pressing means in response to up or down movement of the gripping means. The constant pressure is applied to the lead during drafting and plotting. When the lead is removed from a drafting sheet or is stopped, it is held and lifted up, so as to draw high quality lines and curves independently of the abrasion of the lead.

32 Claims, 11 Drawing Figures

AUTOMATIC PENCIL APPARATUS FOR AN AUTOMATED DRAFTING SYSTEM

BACKGROUND AND SUMMARY OF THE INVENTION

This invention relates to an automatic pencil apparatus for an automated drafting sytem.

An automated drafting system having a drafting head driven by a linear pulse motor or the like and which runs on a drafting paper so as to plot drawings and symbols has been developed. Such a drafting system is already available for practical use.

For these automated drafting systems, drawings were frequently desired to be drawn in pencil lead as usual erasable drawings. However, there was no profitable mechanism which gives the optimum pressure on the lead so as to plot smoothly on the paper and enables removal at the end of drawing lines, and which can slide the lead succesively in response to the abrasion of the lead.

This invention aims to solve the above problems in the combination of a gripping mechanism which holds the lead and lifts it up to a predetermined height, the gripper driving mechanism which actuates the gripper to hold and lift the lead and to release a lead, and the pressing mechanism which gives constant pressure downward on the lead. In the present invention, when the gripping mechanism releases the lead, the tip of lead touches the paper under a predetermined pressure given by the pressing mechanism, independently of the abrasion of lead. On the other hand, when the gripping mechanism holds and lifts up the head, the apparatus according to the present invention enables removal of the lead from the paper. In the apparatus of the present invention, when the lead is used up, the pencil lead worn down is easily exchanged for a new lead.

SUMMARY OF THE INVENTION

It is an object of the invention to provide an improved automatic pencil apparatus.

Another object of the invention is to provide an improved automatic pencil apparatus which enables a pencil lead to be easily exchanged for a new pencil lead.

A further object of the present invention is to provide an improved automatic pencil apparatus which has a change-over device to supply a pressing device which applys constant pressure on the pencil lead.

A further object of the present invention is to provide an improved automatic pencil apparatus which has means for applying pressure of compressed air to said pressing means when the pencil lead is simultaneously picked up from the drafting sheet.

DESCRIPTION OF THE PREFERRED EMBODIMENTS

Figure 1:
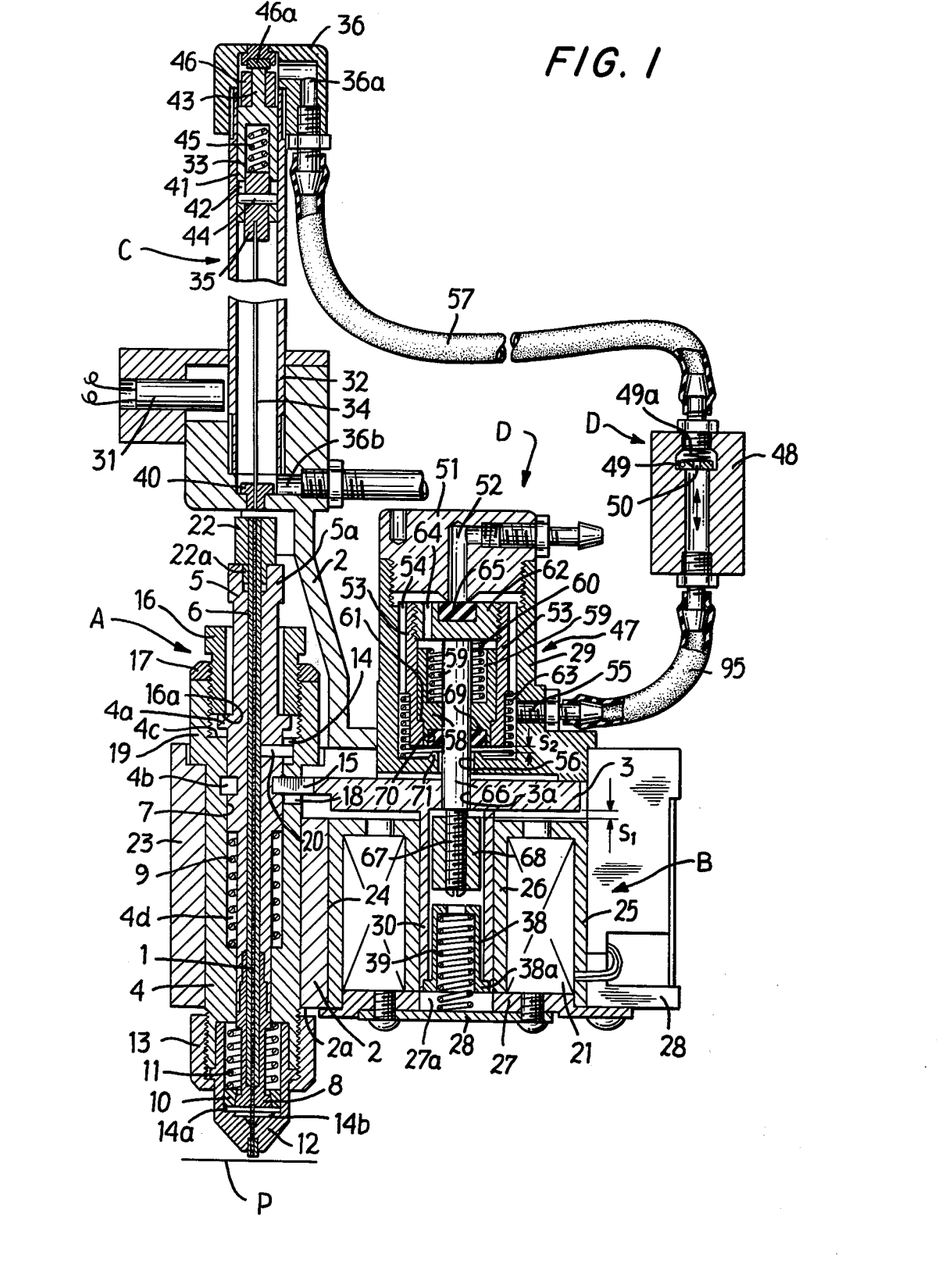
FIG. 1 is a cross-sectional view of a first embodiment of the present invention.
Figure 2:
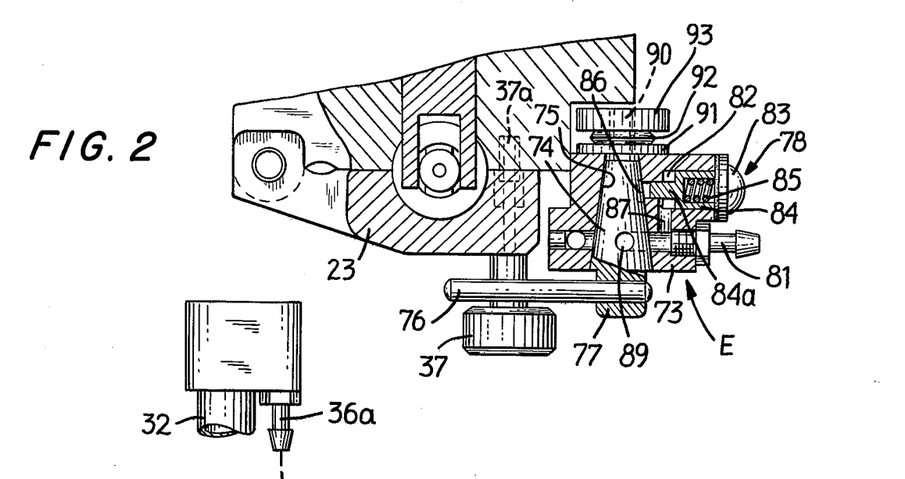
FIG. 2 is a horizontal sectional view of a locking mechanism E which is included in the said embodiment.
Figure 3:
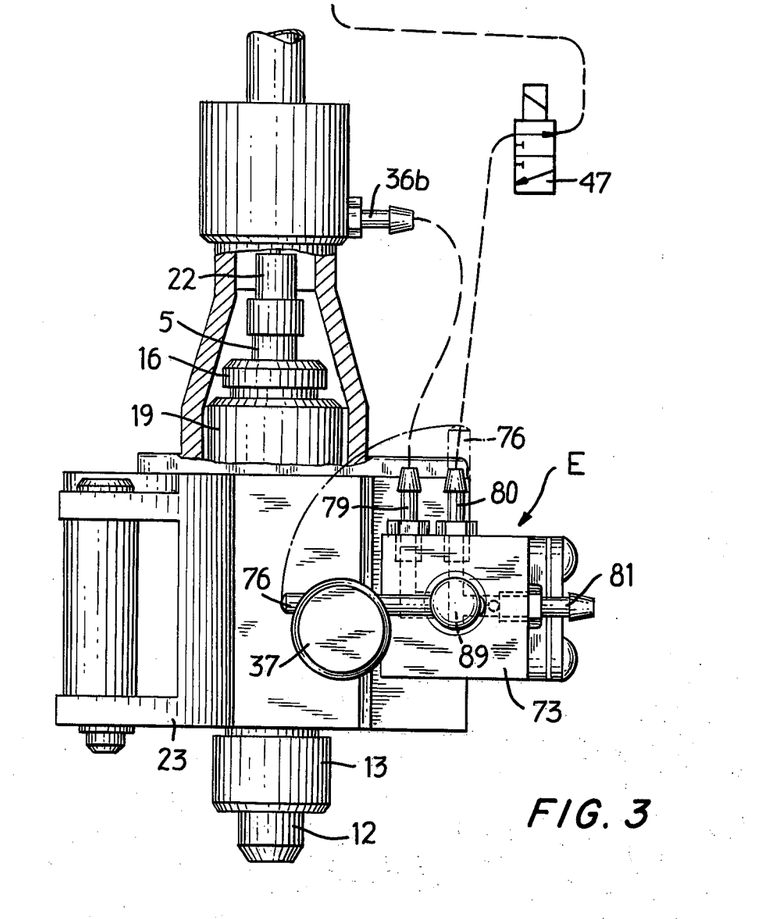
FIG. 3 is an elevational view of the first embodiment of the present invention.

Referring now to FIGS. 1 to 3 an automatic pencil apparatus embodiment of the present invention comprises a gripping device A for gripping or releasing a lead 1, a driving device B to drive said gripping device A, a pressing device C to apply constant pressure to a drafting sheet P through the pencil lead 1, a change-over device D to selectively supply said pressing device C with the constant pressure in response to upward or downward movement of said gripping device A, and locking mechanism E.

The gripping device A includes an attaching frame 2 which extends from a drafting head (not shown) of the automated drafting system, a cylindrical tube 4, a plunger 5 which guides the lead 1 through a guide tube 6, a collet 8 which is coaxially inserted in the end portion of the plunger 5, a spring 9 which is disposed in counter-bore housing 4d defined between the inner surface of the cylindrical tube 4 and the outer surface of the smaller cylindrical body of the plunger 5, a cover 12 which is inserted in the lower end of the cylindrical tube 4 and which is mounted by the box nut 13 screwed in the lower portion of the cylindrical tube 4, a tapered ring 10 surrounding the lower end of the collet 8, a spring 11 which is disposed in the housing defined between the outer surface of collet 8 and the inner surface of the cover 12, and a holding cover 23 for holding the cylindrical tube 4.

The cylindrical tube 4 has the enlarged head 19 adapted to seat and rest on the top of the attaching frame 2. The enlarged head 19 has the ring stopper 16 which is screwed therein and which is locked by means of set-nut 17 so as to lock vertical movement of the ring stopper 16. And a key way 14 is formed in the inner surface of the enlarged head 19. The cylindrical tube 4 is provided with a slot 18 extending there into so as to receive the two-forked portion 15 of a attracted plate 3 described hereinafter.

The plunger 5 is vertically slideably inserted into the through hole 7 and has a pair of grooves 4b adapted to receive the two-forked portion 15 of the attracted plate 3 described hereinafter, a key 20 projecting from the plunger 5 into the key way 14 to prevent the plunger 5 from turning in the cylindrical tube 4 and a flanged portion 4a disposed between the lower end surface 16a of the stopper 16 and a shoulder 4c of the enlarged head 19. The flanged portion 4a prevent the plunger 5 from moving further upwardly.

In the situation that an electromagnet 21 is not energized, the plunger 5 is normally urged by the spring 9 the force of which is stronger than the force of the spring 11.

The guide tube 6 slideably guiding the pencil lead 1 is slideably inserted into the plunger 5. The smaller cylindrical body 22a of the upper stopper 22 is inserted to the bore of the enlarged upper end portion 5a of the plunger 5. The upper end portion of the guide tube 6 is extended into the upper stopper 20 and the lower end portion of the guide tube 6 is inserted into the inner portion of the collet 8.

In the condition that the electromagnet is deenergized, the collet 8 is normally closed because the spring 11 always presses the tapered ring 10 in the downward direction, and the collet 8 holds the pencil lead 1.

The holding cover 23 has a knob 37 having set-screw 37a and the set-screw 37a is screwed in the attaching frame 2 through the holding cover 23, so that the cylindrical tube 4 is steadily held between the holding cover 23 and the attaching frame 2.

The driving device B comprises the electromagnet 21 fixed and inserted into the hole 24 of the frame 2 and the attracted plate 3 attracted when the electromagnet 21 is energized.

The electromagnet 21 is inserted into a box ring cover 25 covering the exterior thereof. The cover 25 comprises the box 26 covering the inner and outer surfaces of the electromagnet 21 and the ring plate 27 covering the lower end face of the electromagnet 21. The ring plate 27 is fixed on the under surface 2a of the frame 2 and has the bottom plate 28 which closes the hole 27a of the ring plate 27 and which is fixed on the ring plate 27 by means of some screws.

The attracted plate 3 has the two-forked portion 15 projecting therefrom into the groove 4b of the plunger 5 through the slot 18 of the cylindrical tube 4, the through hole 3a formed in the central portion of the attracted plate 3, the hollow tube 30 which is formed on the under surface of the attracted plate 3 and which is slideably projected into the central hole of the box ring cover 25. Into the interior of the hollow tube 30 is loosely inserted the supporting tube 38 having the flanged portion 38a supporting the lower end portion of the hollow tube 30. The pressure of the coil spring 39 inserted into the interior of the supporting tube 38 is applied to the supporting tube 38 so as to always touch with the lower surface of a valve box as described hereinafter, when the electromagnetic is deenergized.

The pressing device C for applying constant pressure on the lead 1 comprises the frame 2 extended over the plunger 5, the detector 31 mounted on the frame 2, the cylinder 32 fixed on the frame 2 and in the coaxial position relative to the guide tube 6, the piston 33 slidablly inserted into the cylinder 32, the pushing rod 34 held by means of the piston 33 through the holder 35, the cylinder head 36 having the upper opening 36a attached to the upper portion of the cylinder 32 and the lower opening 36b attached to the lower portion of the cylinder 32.

The pushing rod 34 is coaxially disposed relative to the guide tube 6 through the ring guide 40 which is attached to the lower portion of the cylinder 32.

The piston 33 comprises the cylinder body 41 having the slot 42 formed at the lower portion of the cylinder body 41 and the projection 43 formed on the upper end portion of the cylinder body 41. The holder 35 is slidably inserted into the cylinder body 41 and has a pin 44 which projects from the holder 35 into the slit 42 to prevent the holder 35 from dropping off from the cylinder body 41, and the spring 45 inserted in the cylinder body 41 downwardly biases the holder 35. The ring permanent magnet 46 receives the projection 43. The piston 33 is upwardly or downwardly moved, when compressed air is applied to the lower opening 36b or the upper opening 36a, respectively. When the compressed air is supplied to the upper opening 36a and air is exhausted from the cylinder 32 to the atmosphere, the piston 33 is downwardly pressed and moved. As a result, the piston 33 constantly pushes the upper end of the pencil lead 1 by means of the pushing rod 34. In the condition that the pencil lead 1 is touched to the drafing sheet P, the pressure of the compressed air is applied on the drafting sheet P through the pencil lead 1. The spring 45 absorbs the shock applied to the holder 35 when the piston 33 comes into collision with the stopper 46a.

The detector 31 detects the ring permanent magnet 46 when the ring permanent magnet 46 approaches the detector 31, and the detector 31 generates a electric signal.

The change-over device D includes the valve 47 which controls the quantity of the compressed air supplied to the upper opening 36a and the check valve 48 having the movable member 49 provided with the orifice 50. A coil spring 49a pushes the movable member 49 in the downward direction.

The valve 47 comprises the valve box 29 having the cylindrical body and fixed on the frame 2, the valve head 51 having the conduit 52 into which the constant compressed air is supplied and which is screwed into the upper portion of the cylindrical body i.e. the valve box 29, and the cylindrical slider 53 slidably inserted into the valve box 29 and provide with the air groove 54 through which compressed air passes.

The valve box 29 is provided with the first opening 55 and the second opening 56 in the lower portion thereof. While the first opening 55 communicates with the upper opening 36a of the cylinder 32 through the tube 57, the second opening 56 communicates with the atmosphere.

The cylindrical slider 53 includes the plunger 58 having the through hole 59 into which the spring 60 is inserted and which is supported on the shoulder 61 formed at the inner lower portion of the cylindrical slider 53, and the closing member 62 for closing the upper portion of the cylindrical slider 53. The cylindrical slider 53 is upwardly urged by means of the coil spring 63 inserted into the cylindrical slider 53. The closing member 62 for closing the conduit 52 of the valve head 51 has the through hole 64 opened from the upper to the lower surface, the elastic member 65 inserted into the hollow formed on the upper surface of the closing member 62, and the reciprocating rod 66 mounted on the under surface of the closing member 62. And the closing member 62 is screwed into the upper inner portion of the cylindrical slider 53.

The reciprocating rod 66 has the screw 67 screwed into the adjuster (nut) 68 and vertically projects from the closing member 62 into the hollow tube 30 through the plunger 58.

The clearance $S_1$ is defined between the upper surface of the adjuster 68 and the under surface of the attracted plate 3, when the conduit 52 is closed with the elastic member 65.

The plunger 58 is provided with the elastic ring 69 surrounding the exterior surface of the reciprocating rod 66 in the groove 70 between the plunger 58 and the reciprocating rod 66.

The clearance $S_2$ is defined between the under surface of said elastic ring 69 and the projection 71. The plunger 58 is always urged by the spring 60 inserted therein.

The locking mechanism E shown in FIGS. 2 and 3 is the device for preventing the holding cover 23 from being opened during the condition that the pushing rod 34 is inserted into the guide tube 6. The locking mechanism E prevents the pushing rod 34 from being bent, when the cylindrical tube 4 is removed from the frame 1. The lock mechanism E comprises the cock frame 73 fixed on the frame 2, the cock shaft 74 rotatably inserted into the taper hole 75, and the lever 76 one end of which is fixed and inserted into the hole formed at the one end projection 77 of the cock shaft 74.

The cock frame 73 has the first and the second exhaust air conduits 79.80, the admission air conduit 81, and the locking mechanism 78 for locking the rotation of the cock shaft 74.

The first and the second exhaust air conduits 79.80 communicate with the upper and the lower openings 36a.36b of the cylinder 32 respectively 25.

The constant compressed air is supplied into the admission air conduit 81.

The locking mechanism 78 comprises the cylindrical hole 82 formed at the cock frame 73, the cap 83 closing the cylindrical hole 82 and the piston 84 inserted into the cylindrical hole 82 and urged by means of the coil spring 85 inserted into the hole of the piston 84 in the direction of the cock shaft 40.

The piston 84 has a projection 84a projecting from the cylindrical hole 82 into the depression 86 of the cock shaft 74 through the cock frame 73. The projection 84a is removed from the depression 86, when the compressed air is supplied into the admission air conduit 81 i.e. into the cylindrical hole 82 through the conduit 87. When the compressed air is not contrary supplied into the cylindrical hole 82, the projection 84a projects into the depression 86.

The cock shaft 74 has the T-shaped through hole 89 as shown in FIG. 3, the screw 90 extending of the cock frame 73, and the spacer 91 and the washer 92 and the nut 93 into which the screw 90 is inserted.

When the lever 76 is turned in the horizontal direction, the admission air conduit 81 communicats with the first exhaust air conduit 79 through the T-shaped through hole 89 so that the compressed air is supplied into the conduit 52 of the valve head 51. When the lever 76 is turned in the vertical direction as shown in FIG. 3, the admission air conduit 81 communicates with the second exhaust air conduit 80 so that the compressed air is supplied into the lower opening 36b of the cylinder 32. If the compressed air is supplied into the admission air conduit 81 and the cylindrical hole 82, the cock shaft 74 is locked by inserting the projection 84a of the piston 84 into the depression 86 of the cock shaft 74 in the condition that the lever 76 is turned in the horizontal direction.

The changing of a new pencil lead 1 in the automatic pencil apparatus of the present invention is carried out as follows:

The lever 76 is turned in the horizontal direction so that the compressed air is supplied into the lower opening 36b of the cylinder 32. In this condition, the piston 33 strikes the elastic member 94.

The pushing rod 34, therefore, escapes from the guide tube 6. The knob 37 having set-screw 37a is loosened so that the holding cover 23 is opened.

The cylindrical tube 4 is released from the frame 2 and the new pencil lead 1 is supplied into the guide tube 6.

The cylindrical tube 4 is attached to the frame 2 by screwing the screw of the knob 37 into the screw hole of the frame 2 again.

The lever 76 is turned to the horizontal position as drawn by a full line.

The drawing operation carried out by the automatic pencil apparatus of the present invention is as follows:

In the condition that the lever 76 is turned to the horizontal direction, the compressed air is supplied into the conduit 52. When the electromagnet 21 is energized, the attracted plate 3 is attracted to the electromagnet 21 thereby moving the adjuster 68 downwardly.

When the adjuster 68 is moved downwardly, the cylindrical 53 slides downwardly slided in the valve box 29. As a result, the conduit 52 is opened and the second opening 56 is closed with the elastic ring 69. Then the compressed air is supplied from the conduit 52 to the tube 95 through the air grooves 54 of the valve box 29.

The compressed air is further supplied into the cylinder 32 through the check valve 48 and the upper opening 36a. Then the pressure of the compressed air is not reduced by the check valve 48. The pressure of the compressed air is applied on the paper or sheet P through the piston 33, the pushing rod 34 and the pencil lead 1.

When the plunger 5 is moved downwardly, the lowest position of the tapered ring 10 is limited by a stopper 14a formed on the bottom of the cover 12 and the lower end portion of the collet 8 is further inserted into the smaller inner portion 14b of the cover 12. As a result, the lower end portion of the collet 8 is opened so that the pencil lead falls on the sheet P. The pressure of the compressed air supplied into the upper opening 36a keeps the lead 1 in contact with the sheet P. In this condition with the pencil lead 1 kept in contact with the sheet P, as the frame 2 is moved a diagram or a letter, etc. is drawn on the sheet P.

The operation by which the collet 8 picks up the lead 1 from the sheet P is as follows:

When the electromagnet is changed from the energized condition to the deenergized condition, the attracted plate 3 is raised by means of the pressure of the spring 39 until the flanged portion 4a touches the lower end surface of the stopper 16. As soon as the taper surface of the collet 8 is inserted into the taper ring 10, the collet chucks and picks up the pencil lead 1. Then the cylindrical slider 53 is raised by means of the spring 63 whereby the conduit 52 is closed with the elastic member 65 while the second opening 56 is opened.

The spring 63 is stronger than the spring 96. As a result, the interior of the valve box 29 communicates with the atmosphere and the compressed air for pressing the piston 33 flows from the tube 95 to the atmosphere through the interior of the valve box. Then the pressure of the compressed air is reduced by the check valve 48 whereby the piston 33 is pressed with the reduced air in the cylinder 32. This prevents the pushing rod 34 from jumping up and dropping, i.e., from striking the pencil lead 1 whereby the upper end portion of the pencil head 1 is prevented from being broken.

FIGS. 4 to 10 show further three embodiments of the present invention.

In each of the other embodiments, there is only a difference in construction of the check valve 48 described hereinbefore.

Figure 4:
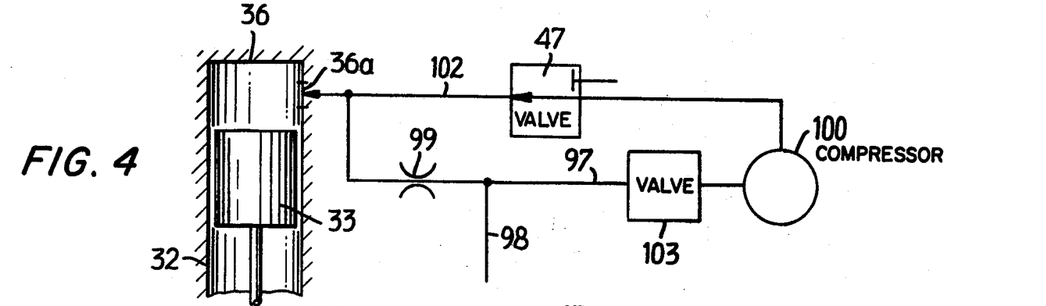
FIGS. 4 and 5 are a schematic block diagram of second embodiment of the present invention.
Figure 5:
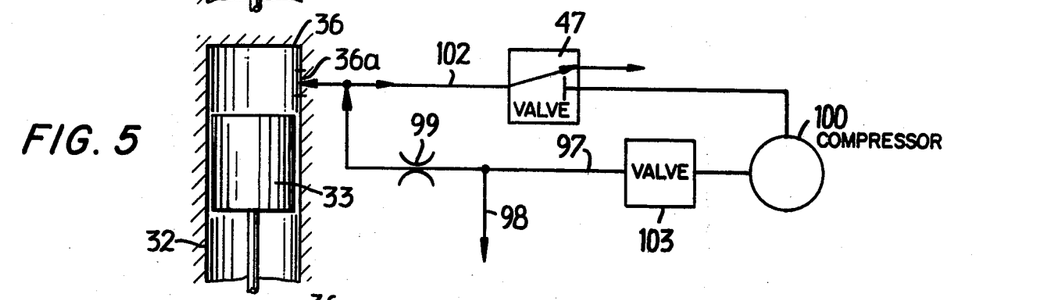

In FIGS. 4 and 5, the upper opening 36a of the cylinder 32 communicates with the conduit 97 into which the compressed air is supplied from air source such as a compressor 100.

And in the condition that the electromagnetic valve 103 is opened, the compressed air supplied from the compressor 100 into the conduit 97 is partially exhausted into the atmosphere through the pipe 98 and is further passed through an orifice 99 so that the compressed air is suitably reduced to a lower pressure.

Referring to FIG. 4, when the pressure of the compressed air supplied into the cylinder head 36 through the valve 47 is applied on the piston 33, the electromagnetic valve 103 is closed so that the compressed air is not supplied into the cylinder head 36 through the pipe 97. The pressure of the compressed air is supplied on the sheet P through the piston 33 and the pencil lead 1. In this condition, the movement of the pencil lead 1 on the sheet 1 allows a drawing to be drawn on the sheet P by moving the pencil lead 1 on the sheet P.

Referring to FIG. 5, when the pencil lead 1 is picked up from the sheet P with the aid of the collet 8, the tube 102 communicates with the atmosphere through the valve 47.

And the compressed air is supplied into the upper opening 36a through the valve 103 and the orifice 99. The pressure of the compressed air is reduced and applied to the piston 33 so as to prevent the pushing rod 34 from striking the upper end portion of the pencil lead 1.

Figure 6:
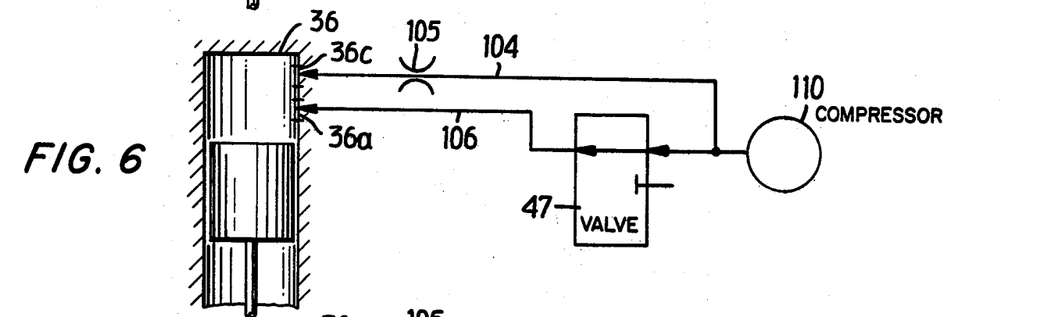
FIGS. 6 and 7 are a schematic block diagram of a third embodiment of the present invention.
Figure 7:
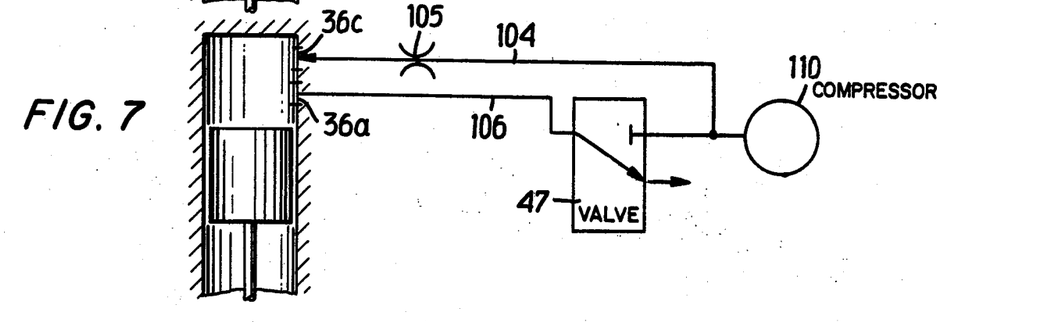
Figure 8:
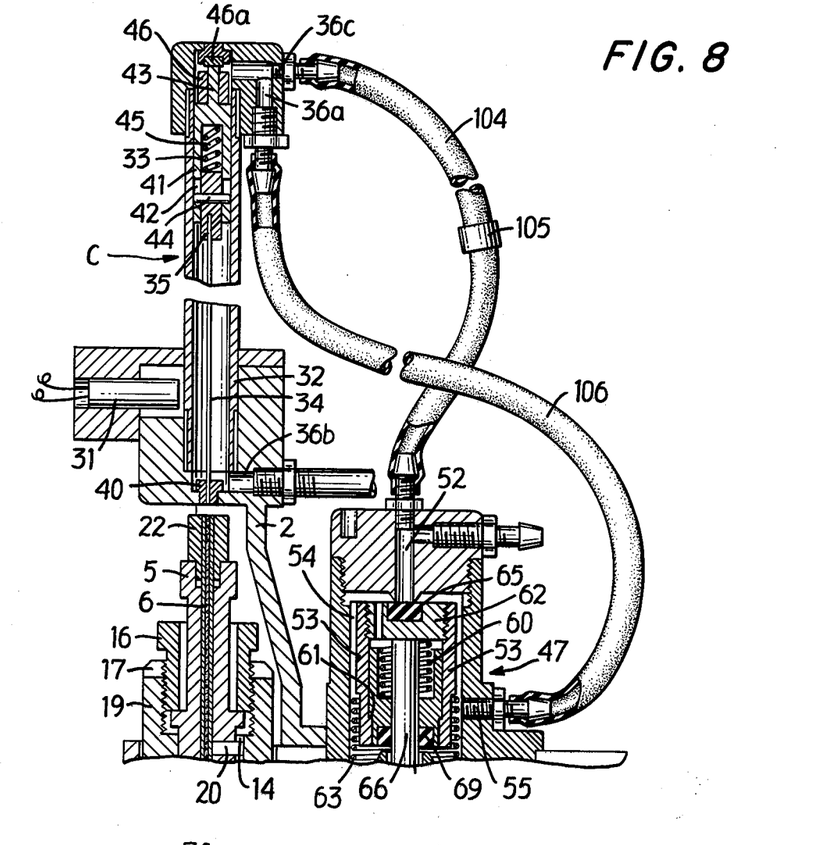
FIG. 8 is a cross-sectional view of the third embodiment of the present invention.

In FIGS. 6 to 8, the upper opening 36c communicates with the conduit 52 through the pipe 104 having the orifice 105. The compressed air supplied into the conduit 52 is reduced with the orifice 105 and is supplied into the upper opening 36a.

Referring to FIG. 6, when the electromagnet 21 shown in FIG. 1 is energized, the upper openings 36a, 36c communicate with the first opening 55 and the conduit 52, respectively. This condition permits drawing on the sheet P by moving the pencil lead because the pressure of the compressed air supplied into the upper opening 36a is applied to the sheet P through the pencil lead 1.

Referring to FIG. 7, in the moment that the electromagnet 21 is deenergized whereby the pencil lead 1 is picked up from the sheet P with the aid of the gripping device A, the tube 106 communicates with the atmosphere through the valve 47, while the compressed air supplied into the conduit 52 is supplied into the upper opening 36c through the orifice 107 whereby the pressure of the compressed air reduced by means of the orifice is applied to the piston 33. As a result, this prevents the pushing rod 34 from striking the upper end portion of the pencil lead 1.

Figure 9:
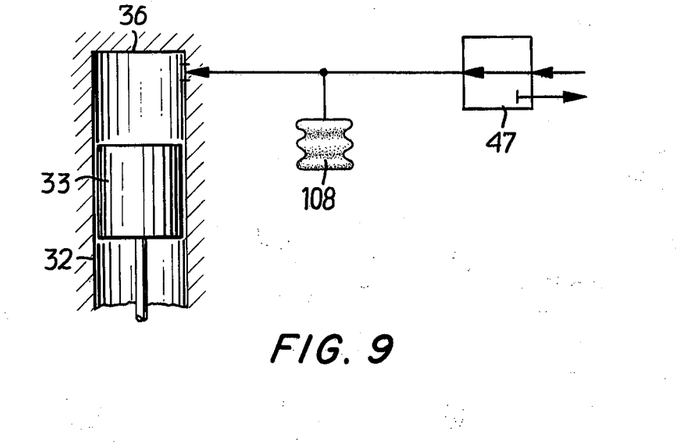
FIGS. 9 and 10 are a schematic block diagram of a fourth embodiment of the present invention.
Figure 10:
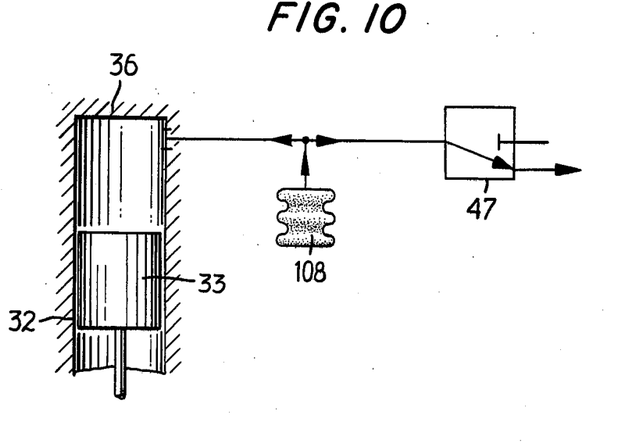
Figure 11:
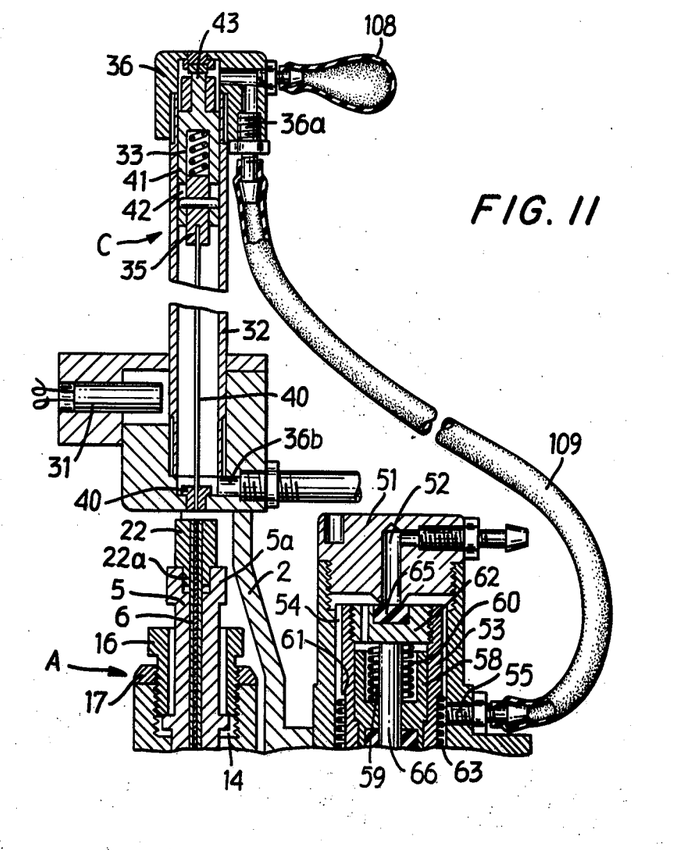
FIG. 11 is a cross-sectional view of the fourth embodiment of the present invention.

Further referring to FIGS. 9 to 11, the cylinder head 36 of the cylinder 32 is provided with an accumulator 108 which is like the balloon made of rubber. The pressure of the compressed air supplied from the conduit 52 into the cylinder head 36 is partially accumulated by means of the accumulator 108.

Referring to FIG. 8, when the electromagnet 21 (shown in FIG. 1) is energized, the upper opening 36a communicates with the first opening 55. In this condition, the compressed air supplied into the conduit 52 is supplied into the cylinder head 36 and the accumulator 108. The pressure of the compressed air is applied on the piston 33 to thereby permit a drawing on the sheet P by moving the pencil lead 1 on the sheet P, while compressed air is accumulated in the accumulator 108.

Referring to FIG. 10, in the moment that the electromagnet 21 is deenergized, the pencil lead 1 is picked up from the sheet P with the aid of the gripping device A and the upper opening 36a communicates with the atmosphere through the valve 47. At the same time, the compressed air is stocked in the accumulator 108 to thereby prevent the compressed air from being completely exhausted from the inner portion of the cylinder 32 to the atmosphere and the pressure of the compressed air in the accumulator is applied to the piston 33. As a result, the pushing rod 34 is prevented from striking the upper end portion of the pencil lead 1.

What I claim:

1. An automatic pencil apparatus for an automated drafting system comprising, releasable gripping means for gripping or releasing a lead, driving means for driving said gripping mechanism to different positions, pressing means for applying constant pressure to the pencil lead to press the pencil lead in use against a drafting sheet with a constant pressure, and change-over means for supplying the constant pressure to and removing the constant pressure from said pressing means in response to the vertical movement of said gripper, wherein said change-over means includes means for removing the constant pressure at a controlled rate to gently release the pencil lead.

2. An automatic pencil apparatus as claimed in claim 1, wherein said pressing means has a pneumatic cylinder and a piston which is connected with a pushing rod, an end of said pushing rod being contactable to the lead rear end.

3. An automatic pencil apparatus as claimed in claim 2, wherein said change-over means comprises a housing provided with a compressed air inlet, a first outlet to supply compressed air inlet to the pneumatic cylinder and a second outlet opening in the atmosphere, and a change-over valve to respectively connect the inlet and the outlet, or the first and second outlets corresponding to vertical movement of said gripper through the chamber of the housing.

4. An automatic pencil apparatus as claimed in claim 3, wherein said driving emchanism includes an electromagnet which connects the change-over valve and moves said gripper in the longitudinal direction against spring action so as to actuate the gripping mechanism.

5. An automatic pencil apparatus as claimed in claim 4 includes means for applying the pressure of a compressed air to said pressing means which has means for applying pressure of compressed air to said pressing means when the pencil lead is simultaneously picked up from the drafting sheet.

6. An automatic pencil apparatus as claimed in claim 5 includes a locking mechanism for preventing a pushing rod from being bent.

7. An automatic pencil apparatus as claimed in claim 4 includes a locking mechanism for preventing a pushing rod from being bemt.

8. An automatic pencil apparatus as claimed in claim 3 includes means for applying the pressure of a compressed air to said pressing means which has means for applying pressure of compressed air to said pressing means when the pencil lead is simultaneously picked up from the drafting sheet.

9. An automatic pencil apparatus as claimed in claim 8 includes a locking mechanism for preventing a pushing rod from being bent.

10. An automatic pencil apparatus as claimed in claim 3 includes a locking mechanism for preventing a pushing rod from being bent.

11. An automatic pencil apparatus as claimed in claim 2, wherein said driving mechanism includes an electromagnet which moves said gripper in the longitudinal direction against spring action so as to actuate the gripping mechanism.

12. An automatic pencil apparatus as claimed in claim 11 includes means for applying the pressure of a compressed air to said pressing means which has means for applying pressure of compressed air to said pressing means when the pencil lead is simultaneously picked up from the drafting sheet.

13. An automatic pencil apparatus as claimed in claim 12 includes a locking mechanism for preventing a pushing rod from being bent.

14. An automatic pencil apparatus as claimed in claim 11 includes a locking mechanism for preventing a pushing rod from being bent.

15. An automatic pencil apparatus as claimed in claim 2 includes means for applying the pressure of a compressed air to said pressing means which has means for applying pressure of compressed air to said pressing means when the pencil lead is simultaneously picked up from the drafting sheet.

16. An automatic pencil apparatus as claimed in claim 15 includes a locking mechanism for preventing a pushing rod from being bent.

17. An automatic pencil apparatus as claimed in claim 2 includes a locking mechanism for preventing a pushing rod from being bent.

18. An automatic pencil apparatus as claimed in claim 1, wherein said change-over means comprises a housing provided with a compressed air inlet, a first outlet to supply compressed air from the compressed air inlet to said pressing means and a second outlet opening in the atmosphere, a change-over valve positionable within said housing to selectively connect the inlet and outlet, or the first and the second outlets corresponding to the vertical movement of said gripper through the chamber of the housing, and means for storing a charge of compressed air and for supplying the charge of compressed air to said pressing means when said change-over valve connects said first and second outlets so that the pressure applied to said pressure means gradually decreases.

19. An automatic pencil apparatus as claimed in claim 18, wherein said driving mechanism includes an electromagnet which connects the change-over valve and moves said gripper in the longitudinal direction against spring action so as to actuate the gripping mechanism.

20. An automatic pencil apparatus as claimed in claim 19 includes means for applying the pressure of a compressed air to said pressing means which has means for applying pressure of compressed air to said pressing means when the pencil lead is simultaneously picked up from the drafting sheet.

21. An automatic pencil apparatus as claimed in claim 20 includes a locking mechanism for preventing a pushing rod from being bent.

22. An automatic pencil apparatus as claimed in claim 19 includes a locking mechanism for preventing a pushing rod from being bent.

23. An automatic pencil apparatus as claimed in claim 18 includes means for applying the pressure of a compressed air to said pressing means which has means for applying pressure of compressed air to said pressing means when the pencil lead is simultaneously picked up from the drafting sheet.

24. An automatic pencil apparatus as claimed in claim 23 includes a locking mechanism for preventing a pushing rod from being bent.

25. An automatic pencil apparatus as claimed in claim 18 includes a locking mechanism for preventing a pushing rod from being bent.

26. An automatic pencil apparatus as claimed in claim 1, wherein said driving mechanism includes an electromagnet which moves said gripper in the vertical direction against the pressure of a spring so as to actuate the gripping mechanism through a attracted plate.

27. An automatic pencil apparatus as claimed in claim 26 includes means for applying the pressure of a compressed air to said pressing means which has means for applying pressure of compressed air to said pressing means when the pencil lead is simultanteously picked up from the drafting sheet.

28. An automatic pencil apparatus as claimed in claim 27 includes a locking mechanism for preventing a pushing rod from being bent.

29. An automatic pencil apparatus as claimed in claim 26 includes a locking mechanism for preventing a pushing rod from being bent.

30. An automatic pencil apparatus as claimed in claim 1 includes means for applying the pressure of a compressed air to said pressing means which has means for applying pressure of compressed air to said pressing means when the pencil lead is simultaneously picked up from the drafting sheet.

31. An automatic pencil apparatus as claimed in claim 30 includes a locking mechanism for preventing a pushing rod from being bent.

32. An automatic pencil apparatus as claimed in claim 1 includes a locking mechanism for preventing a pushing rod from being bent.

* * * * *